United States Patent [19]
Andreyko et al.

[11] 3,764,182
[45] Oct. 9, 1973

[54] AUTOMOTIVE ANTI-SKID BRAKING

[75] Inventors: Michael Andreyko, Philadelphia; William C. Follmer, Norristown, both of Pa.

[73] Assignee: Philco-Ford Corporation, Philadelphia, Pa.

[22] Filed: June 23, 1971

[21] Appl. No.: 155,824

[52] U.S. Cl. .......................... 303/21 EB, 188/181 C
[51] Int. Cl. .............................................. B60t 8/08
[58] Field of Search .................. 188/181 C; 303/20, 303/21; 317/5; 318/52; 324/160–161; 340/263

[56] References Cited
UNITED STATES PATENTS

| | | | |
|---|---|---|---|
| 3,494,671 | 2/1970 | Slavin et al. | 303/21 P |
| 3,642,328 | 2/1972 | Holland | 303/21 R X |
| 3,574,415 | 4/1971 | Stamm | 303/21 EB |
| 3,608,978 | 9/1971 | Neisch | 303/21 EB |
| 3,498,682 | 3/1970 | Mueller et al. | 303/21 BE |
| 3,503,654 | 3/1970 | Stamm | 303/21 EB |
| 3,602,553 | 8/1971 | Cumming et al. | 303/21 EB |
| 3,620,577 | 11/1971 | Neisch et al. | 303/21 EB |
| 3,499,689 | 3/1970 | Carp et al. | 303/21 P |
| 3,503,653 | 3/1970 | Davis et al. | 303/21 B |
| 3,576,350 | 4/1971 | Larsen | 303/21 F |

*Primary Examiner*—Milton Buchler
*Assistant Examiner*—Stephen G. Kunin
*Attorney*—Robert D. Sanborn

[57] ABSTRACT

In a four-wheel brake automotive system that so proportions the braking force that a substantially greater fraction of the available braking occurs at the front wheels, anti-skid braking is achieved by employing an automatic control system to adjust the overall braking action to produce a controlled slip between the faster rear wheel and the slower front wheel. This yields a high degree of vehicle stability without substantial sacrifice of stopping capability in terms of ideal braking.

9 Claims, 9 Drawing Figures

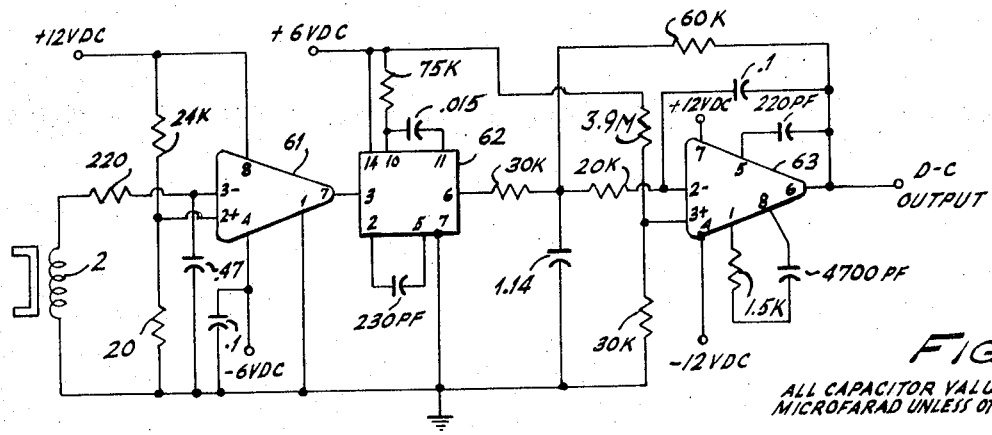
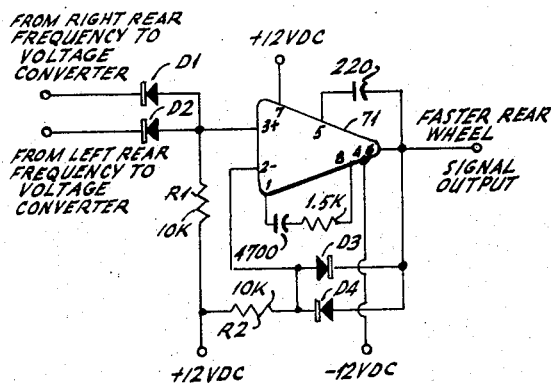
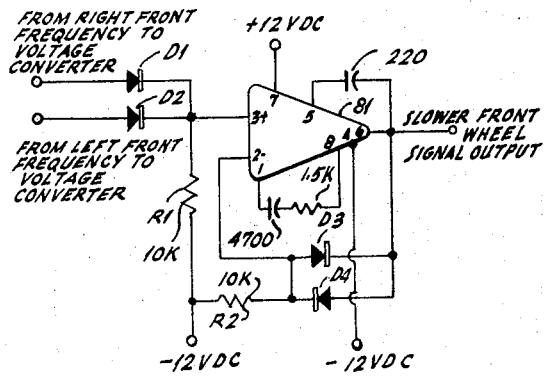
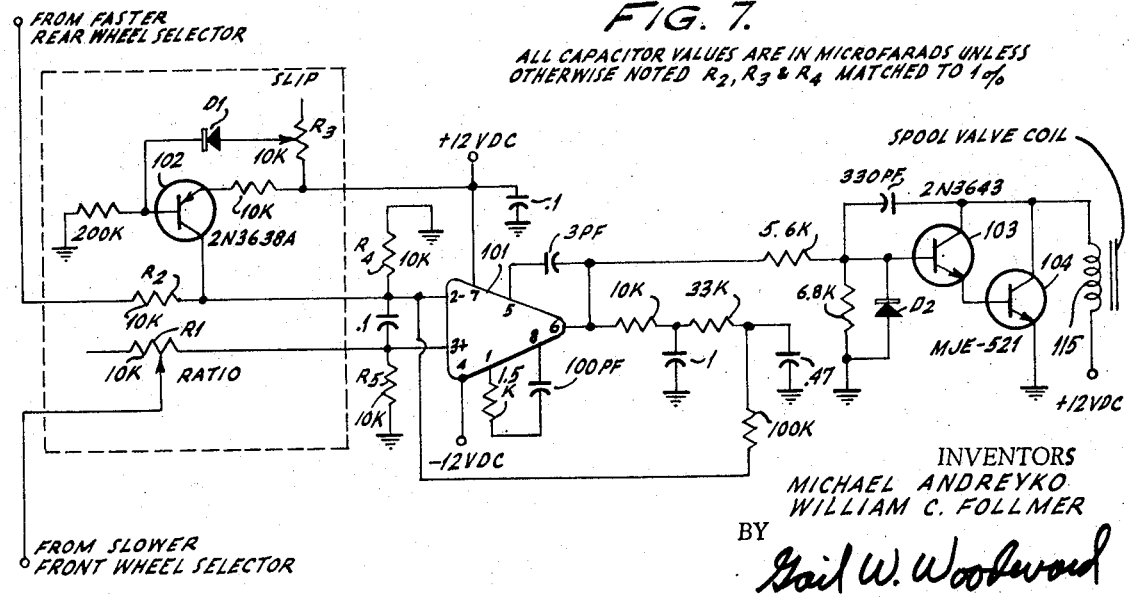

AUTOMOTIVE ANTI-SKID BRAKING

BACKGROUND OF THE INVENTION

In any wheeled vehicle braking system, the kinetic energy of motion must be removed in order to stop the vehicle. The braking system ordinarily converts the kinetic energy into heat which is wasted or dissipated into the ambient atmosphere or operating surface. Energy conversion occurs mainly in two areas. The wheel brakes convert rotary motion into heat by the rubbing action of the brake shoe or pad on the brake drum or dis. When a restraining force is applied to a wheel, a relative sliding motion (that is, "slip") takes place between the contacting wheel and road surfaces and heating of these surfaces occurs. If the braking action is strong enough to lock the wheel, no heat is generated in the brake itself and all of the energy conversion occurs at the wheel to operating surface (i.e., tire to road) interface. Since the area of tire in contact with the road is relatively small and the energy conversion large, substantial temperature rises are encountered and tire melting may occur. The smoke accompanying a locked-wheel stop is evidence of the excessive temperatures.

At very low braking force the brakes account for most of the energy conversion. As braking force is increased wheel slip accounts for a greater and greater proportion of the energy until the locked wheel condition occurs. At some point an optimum condition occurs where the energy conversion is shared between the brake and the tire-road interface. This implies substantial wheel slippage on the operating surface but not a locked wheel. The condition of wheel slippage on the operating surface is often referred to as "wheel skid."

Another vehicular consideration relates to stability during stopping. When there is very small wheel slippage during stopping, complete control is present. The steering is normal, and the system is controllable. Under locked-wheel conditions the system is uncontrollable. Steering has no effect and the vehicle may rotate about the vertical axis that passes through the center of gravity to produce what is called "vehicular skid." In this specification unless otherwise indicated the term "skid" will refer to the vehicular skid rather than wheel slippage.

A great deal of thought and effort has been directed toward achieving an economical, reliable and effective anti-skid system for automotive use. The most effective systems, particularly when made reliable, are quite expensive. While such expense might be acceptable for commercial or special vehicles, it deters the use of such systems on conventional automotive products.

In one prior art system the rotation of each wheel is compared with the vehicle velocity. The braking effort a[...] .d to each wheel is then adjusted for the optimum co[...]tions desired during stopping. An optimum or sh[...] .test distance stop would result from optimizing the slippage of each wheel for maximum braking. This requires input data on the force-slip relationship, the nature of the operating surface and tire characteristics along with indications of the presence of water, ice, snow or other friction altering materials. In addition to the necessary transducers for sensing all of the required variables, a computer must be used to combine all of the inputs and then provide the required control function signals.

Even the simple speed function sensing presents a problem. A special or extra wheel can be used to contact the roadway for the sole function of measuring speed. Alternatively an inertial navigation system can be employed or a radar device aimed at the roadway can provide the required data. All of these methods involve relatively complicated and expensive devices.

In a recent system a compromise approach has appeared in the form of a time-shaing operation. One or more braked wheels is periodically released and its rotation during the unbraked period used to measure speed. This approach reduces braking efficiency and applies some severe transients to the system due to brake on-off sequence.

SUMMARY OF THE INVENTION

It is a principal object of this invention to provide an automotive anti-skid braking system that is simple, reliable, and of low cost.

It is a further object to provide anti-skid braking action in a simple low-cost system that also provides near optimum braking action.

It is a further object to make the anti-skid braking compatible with a conventional braking system.

It is a further object to control braking by modulating the brake force at a single point to control the braking action in accordance with sensed wheel speed difference between front and rear wheels.

These and other objects are accomplished in the following manner. First, a conventional four-wheel brake system is selected in which substantially greater proportionate braking forces are applied to the front wheels. Typically the brake system torque is proportioned such that the rear wheels operate at 70 percent efficiecy when the front wheels are at 100 percent efficiency. This choice alone provides good braking stability without sacrificing substantial stopping efficiency. Due to the typical weight balance in the front-engined automobile and the inertial effects during stopping, the front wheels normally do most of the braking. Thus with substantial front wheel slippage, or even locked front wheels, the rear wheels can turn and provide anti-skid stability, if excessive pressure is not applied by the operator of the vehicle to the brake pedal. This sytem is still subject to wheel locking and resultant skid action during "panic stop" conditions.

The invention involves an electromechanical hydraulic system added to a conventional proportioned brake system. Each wheel is provided with a tachometer to sense rotation or wheel speed. The electrical signals from the front wheels are compared and the signal from the slower wheel fed to an error detector. The electrical signals from the rear wheels are compared and the signal from the faster wheel fed to the error detector. When the speed difference between the slower front wheel and the faster rear wheel exceeds a preset minimum value, the error detector output provides a signal that causes a hydraulic system to generate a force that reduces braking. This action allows the speed of the slower front wheel to approach more nearly that of the faster rear wheel. The preset value is determined to give maximum front wheel braking. Since the braking forces are proportioned to apply greater front wheel braking, the rear wheels will turn faster and provide good anti-skid or stability properties. Thus, regardless of brake pedal force the maximum braking action is limited close to the optimum value. If desired an override provision can be incorporated for use by highly skilled drivers in emergency conditions.

In the system described it is desirable to control braking action in a manner that can be sensed by the driver. If the hydraulic system used to reduce braking force acts against the brake pedal, the driver will feel the automatic control as a back pressure against the pedal. While the control function can be inserted into the brake lines directly, the feel of automatic action is lost and this mode of operation is considered less desirable.

BRIEF DESCRIPTION OF THE DRAWING

In the drawing

FIG. 4 is a schematic diagram of a wheel speed tachometer circuit including the frequency to voltage converter;

FIG. 5 is a schematic diagram of the faster rear wheel selector circuit;

FIG. 6 is a schematic diagram of the slower front wheel selector circuit;

FIG. 7 is a schematic diagram of the error detector, pulse width modulated oscillator, and amplifier circuits;

DESCRIPTION OF THE OPERATION OF THE PREFERRED EMBODIMENT

Figure 1:
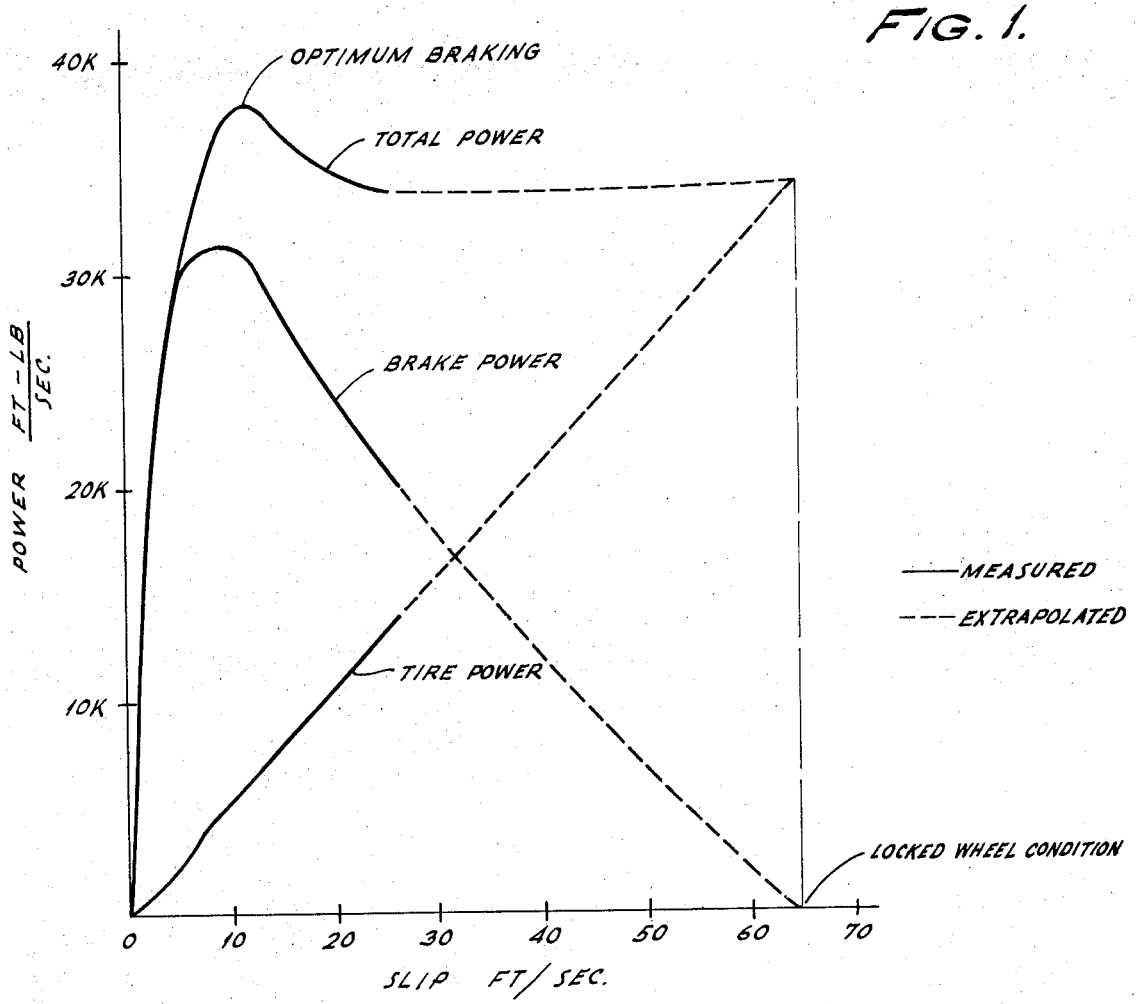
FIG. 1 is a graph showing, for a single wheel and brake, the power dissipated by the brake, by the tire, and by the brake tire combination, as a function of slip.

FIG. 1 shows wheel braking characteristics in a controlled experiment. An automotive radial ply tire was pressed against a dry surface under a force of 560 pounds. The wheel-to-surface velocity was maintained at 65 feet per second. Braking was applied to the wheel and measurements were taken of brake and tire power at particular measured slip values.

It can be seen that measured tire power increases in a linear manner. Measured brake power increases in a linear manner much more rapidly than tire power for small slip values. As slip increases, brake power goes through a maximum and then declines to reach zero at a slip value equal to the wheel-to-surface velocity, that is, at the locked-wheel condition. The total power, the sum of brake and tire power, passes through a peak or optimum braking action condition and then declines to intersect the tire power curve at locked wheel conditions.

While tire power is shown increasing toward the locked wheel condition, the actual curve tends to drop off at higher power values. Precise experimental measurement cannot be made because of the erratic effects produced by excessive tire heating. This will tend to accentuate the peak in the total power curve.

The most interesting aspect of the total power curve it that it passes through its peak or optimum at a relatively low slip value. This means that the most efficient braking occurs along with substantial wheel rotation.

Figure 2:
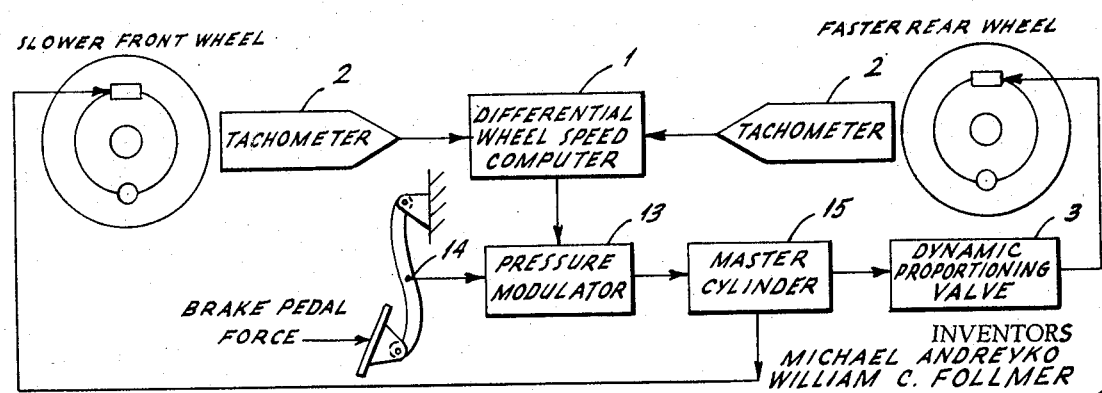
FIG. 2 is a simplified block diagram of the basic system.

FIG. 2 shows the basic system of the invention in block diagram form. A differential wheel speed computer 1 receives information from front and rear wheel tachometers 2. By comparing the slower front wheel with the faster rear wheel, skid avoidance and optimum braking information is available. Since the brake system is proportioned by vehicle weight distibution and by the action of proportioning valve 3 to operate the rear wheel brakes at a lower efficiency than the front wheel brakes, any tendency to lock will first occur at the front wheels as increased brake pressure is developed. As this condition is approached it can be seen that the differential in front to rear wheel speed must increase.

For ordinary braking, where the front to rear speed differential is less than the control threshold in the differential wheel speed computer, no action occurs. For this condition brake pedal 14 force is applied to the master cylinder 15 without change. As more braking force is applied, wheel slip increases with front wheel speed dropping further below that of the rear wheels. At a predetermined differential speed, and well before actual wheel locking, the computer feeds a correcting signal to the pressure modulator 13 which acts to reduce the braking force to the master cylinder. Ideally the computer control action will cause the front wheels to operate at the peak of the total power curve of FIG. 1. Since the rear wheels have less slip they will operate further down on the curve as determined by the programmed differential slip. While this results in a slight reduction of rear wheel braking effectiveness, the system is operated on the rising portion of the curve in FIG. 1 (to the left of the peak) and the feedback system is dynamically stable.

It can be seen that the maximum braking action available at the master cylinder is near optimum, regardless of how much force the driver applies, and all four wheels are turning. This gives the vehicle great stability and skids are avoided. Furthermore since the front wheels turn, steering is available even for shortest distance stopping.

An additional benefit occurs over locked-wheel stopping. Since the wheels are turning, the tire power produced during braking is distributed over the entire tire surface. This greatly reduces tire ablation and avoids the flat spots that develop from locked-wheel stops.

While the above description shows the ideal conditions encountered in the typical automotive system, where the weight is concentrated in front, some systems may have the weight concentrated in the rear. For this condition the differential wheel speed computer is made to sense the faster front wheel and the slower rear wheel with the braking action proportioned to produce the greater braking at the rear wheels. The remainder of this specification will relate to the system where the greater weight is in the front and the system operation is considered for this condition. However both modes are available and useful.

Figure 3:
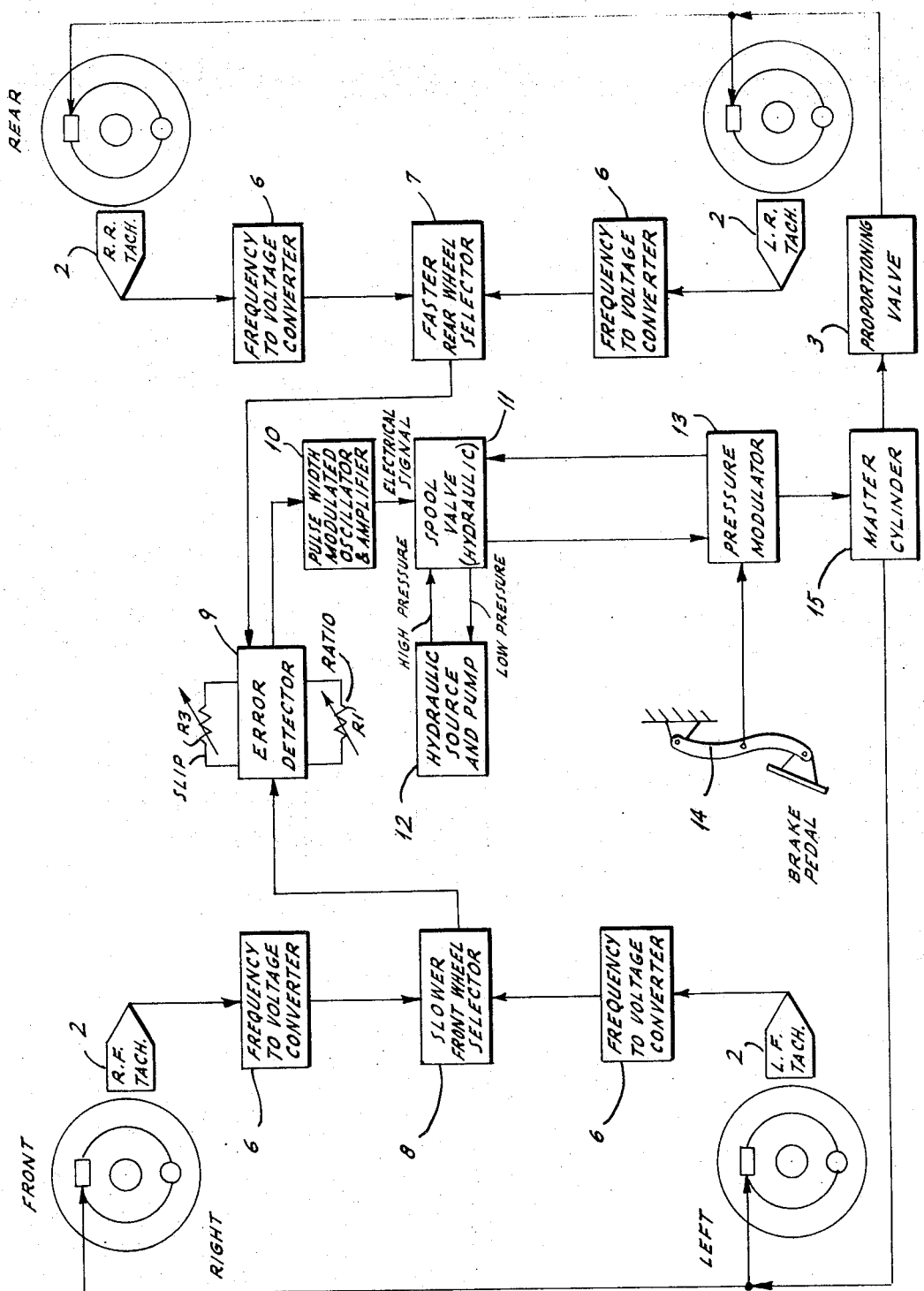
FIG. 3 is a detailed block diagram of the invention.

FIG. 3 is a detailed block diagram of the preferred embodiment. The speed of each wheel is sensed by means of a tachometer 2. Each tachometer consists of an electrical coil wound on a magnetically biased magnetic core that is placed in proximity to a toothed wheel rotating with the vehicle wheel. It has proven adequate to provide notches in the brake disk or drum and to mount the coil assembly so that the core is close to the notched edge. If 142 notches are cut into the disk or drum, the sensitivity is close to 20 electrical pulses per foot of distance travelled. This would give a pulse rate of about 1760 pulses per second at 60 miles per hour. Higher pulse rates give more rapid system response.

Each tachometer is connected to an electronic circuit 6 that converts wheel speed into an analog d-c voltage. Typically the output is zero at zero speed and progresses to a more negative value linearly with increasing speed.

Rear wheel speeds are compared in a selector circuit 7 that selects the d-c voltage representative of the faster rear wheel. This corresponds with selecting the rear wheel with the greater road traction or the lesser wheel slip and will provide a reference value to the system.

Front wheel speeds are compared in a selector circuit 8 that selects the d-c voltage representative of the slower front wheel. This corresponds with selecting the front wheel that has the most slip.

The signals selected by circuits 7 and 8 are applied to an error detector 9 (more fully described below with reference to FIG. 7) which compares them with a reference value as determined by the SLIP control R3. The error detector also contains a RATIO control R1 to provide for an adjustable value of front to rear wheel slip ratio. As wheel slip increases above a threshold, the error detector output will increase and change the operation of the pulse width modulated oscillator and amplifier 10. The oscillator operates at a frequency of about 50 c.p.s. For braking conditions where the differential slip is below threshold the oscillator is inoperative. For slip values above the threshold the oscillator produces positive pulses with a duty cycle proportional to differential slip. The operation of this oscillator circuit is explained more fully below with reference to FIG. 7, and is also taught and claimed in copending application Ser. No. 888,430 filed Dec. 29, 1969, now U.S. Pat. No. 3,612,901.

The oscillator output is amplified and applied to to spool valve 11 (see also FIG. 8) which operates to transfer hydraulic fluid from a source and pump 12 at high pressure to pressure modulator 13. The quantity of hydraulic fluid, and hence the pressure in pressure modulator 13, is a function of the operating cycle of spool valve 11. This valve has an element that is shuttled between two positions by the action of the electrical current from circuit 10. When the spool valve is at one extreme of its travel (current on), hydraulic fluid is coupled from the source and pump 12 directly to pressure modulator 13. At the other extreme of its travel (current off), the fluid in the pressure modulator is returned through the spool valve to a sump for transfer back to the source and pump portion of the system at atmospheric pressure. Thus the pressure modulator will receive fluid in accordance with the percentage of the time the spool valve 11 is cycled to the extreme "current on" position and this is controlled by the duty cycle of circuit 10. Under the condition of an error signal from error detector 9 that is less than the threshold value the current duty cycle (or pulse width) of circuit 10 is zero and the spool valve will transmit no fluid to the pressure modulator. As the error signal increases above threshold, the current duty cycle of circuit 10 increases and the spool valve dwells longer in the state where fluid is passed to the pressure modulator. The pressure modulator is so interposed between brake pedal 14 and master cylinder 15 that the error signal will reduce the force transmitted from the brake pedal 14 to master cylinder 15, thus reducing the braking action. This reduces the differenital wheel slip and the error signal. With appropriate adjustment of slip and ratio controls, R3 and R1, the system will adjust brake pressure regardless of pedal force to a near optimum braking condition.

FIG. 4 shows the schematic diagram of the frequency to voltage converter circuits 6 of FIG. 3. Tachometer 2 provides an a-c signal voltage that drives a wave shaping circuit comprising microelectronic device 61 and the associated resistors and capacitors.

In this specification reference to microelectronic devices is in all cases to a standard item of commerce available from numerous manufacturers and each manufacturer publishes related data sheets showing characteristics and basic requirements. In accordance with industry practice the numbers shown inside the symbols refer to standard pin connections. Unless otherwise specified the devices indicated are packaged in 8–lead TO-5 housings.

Device 61 is standard microelectronic type 710 high-gain differential amplifier. The tachometer output is fed to the inverting input through a 220 ohm resistor, and a 0.47 microfarad capacitor provides low pass filter action to reduce noise and to provide some attenuation of the higher tachometer frequencies. A reference potential of about 0.01 volt is supplied to the noninverting input by way of a voltage divider including a 24K ohm and 20 ohm resistor connected across the 12 volt source. A 0.1 microfarad capacitor is used to bypass the negative 6-volt supply. the output of device 61 is a square wave of constant amplitude at a frequency determined by the output of tachometer 2.

Device 62 is a microelectronic one-shot multivibrator type 951 housed in a standard 14-pin flat package. A 75K ohm resistor connected between pins 10 and 14 and 0.015 microfarad capacitor connected between pins 10 and 11 establish a suitable pulse width. A 230 picofarad capacitor connected between pins 2 and 5 provides a suitable input coupling capacitance. This device, in association with the resistors and capacitors connected thereto, produces a narrow positive output pulse of constant width and amplitude for each cycle of output from device 61.

The output from device 62 is filtered first by a low pass integrator comprising a 30K ohm resistor and a 1.14 microfarad capacitor. A second low pass filter is made up of a 20K ohm resistor and the input capacitance of microelectronic device 63. Device 63 is a standard microelectronic type 709 high-gain differential amplifier. A 220 picofarad capacitor connected between pins 5 and 6 provides output frequency compensation. A 4700 picofarad capacitor in series with 1.5K ohm resistor connected between pin 1 and 8 provide input frequency compensation. These feedback values are standard for the 709 microcircuit to produce a 6-db per octave frequency roll off. The 0.1 microfarad capacitor connected from the output to the inverting input of device 63 causes the amplifier to act as a capacitance multiplier. The input capacitance looking into pin 2, the inverting input, will be on the order of 4500 microfarads which acts with the 20K ohm resistor to produce an integrator or low pass filter action that is very stable. The integrator is direct-current stabilized by a 60K ohm resistor connected from the output to the integrator input. A reference voltage of about 0.045 volt is applied to the noninverting input by the voltage divider comprising the 3.9 megohm and 30K ohm resistors connected across the 6-volt supply. The output of device 63 is a negative d-c voltage that is proportional to tachometer frequency and hence wheel speed. For the system shown, the analog output sensitivity is about 20 feet per second per volt or about 4.4 volts at 60 m.p.h.

Details of the "faster rear wheel selector" 7 of FIG. 3 are disclosed in FIG. 5. It may comprise a type 709 microcircuit 71, with frequency compensation similar to that described with reference to microcircuit 63 of FIG. 4, connected into a circuit that selects the numerically larger of two negative input voltages. The d-c analog signal representing the right rear wheel speed is applied to a circuit comprising D1, R1 and 12-volt source, while the d-c analog signal representing the left rear wheel is applied to a similar circuit comprising D2, R1 and 12-volt source. At zero wheel speed the combined conduction of D1 and D2 is about 1.13 milliamperes. As speed increases, the input voltage increases in a negative direction and diode current increases to drive the non-inverting amplifier input in a negative direction. In the event that one rear wheel operates faster than the other the associated diode will tend to conduct more heavily thereby biasing the other diode off. Thus these diodes constitute the faster-wheel selection mechanism. However due to diode nonlinearity the amplifier input will not be a linear function of wheel speed as was the output of circuit 6. As the input of the amplifier 71 is driven negative the output will also be driven negative. Resistor-diode combination R2-D3 couples the output back to the inverting input to provide a large negative feedback. Since diode D3 operates into the same value of resistance is either D1 or D2 (in FIG. 5 both R1 and R2 are shown as 10,000 ohms) and therefore operates at the same current level, the amplifier transfer characteristic is nonlinear in such a way as to cancel the nonlinear input diode coupling. This action makes the entire circuit quite linear from the input terminals to the output terminal. Diode D4 has no normal function but acts to prevent the circuit from latching during unusual power turn-on transient conditions. D1 through D4 are conventional silicon planar diodes of like characteristics such as commercial FD666 type.

FIG. 6 details the circuit connections for the slower front wheel selector 8 of FIG. 3. The left and right front wheel negative analog d-c voltage signals from the corresponding frequency to voltage converters are applied to two diodes D1 and D2. Microcircuit 81, a 709 device with conventional frequency compensation, is connected into a circuit similar to that of FIG. 5. However, resistors R1 and R2 are returned, at their common junction, to a negative rather than to a positive supply voltage supply.

At zero input, diodes D1 and D2 conduct a combined forward current of about 1.13 milliamperes. As the analog inputs increase, i.e., become more negative, diode conduction decreases to drive the non-inverting input of microelectronic device 81 negative. Since diode D4 couples the negative-going output back to the inverting input, the output voltage will closely follow the input. If one of the inputs to the diodes D1 and D2 increases more rapidly than the other, the associated diode will become reverse biased thereby leaving the smaller of the two inputs coupled through its related diode to device 81. Thus the diodes act to select and pass the smaller of the two input signals. While signal transfer through an input diode is nonlinear, the feedback diode D4 corrects the amplifier transfer function so as to render the entire circuit from input to output linear in response to the smaller of two negative d-c analog inputs. Diode D3 prevents the circuit from latching during unusual power turn-on transient conditions. D1 through D4 are conventional silicon planar diodes of like characteristics such as commerical FD666 type.

In FIG. 7 the error detector 9 of FIG. 3 is shown in the box enclosed with dashed lines. Analog signal voltages from the faster rear wheel selector 7 and the slower front wheel selector 8 are coupled through resistor R2 and rheostat R1 respectively to the inverting and non-inverting inputs respectively of microcircuit 101 and thus causing their effects to be combined in differential fashion. The voltage from the slower front wheel selector 8 is adjusted by means of rheostat R1 to provide the desired value of front to rear speed RATIO in the operating system.

PNP silicon transistor 102, and the associated circuit, provides an adjustable source of constant current which will provide a threshold reference for error detector 9. When R3 is set for minimum resistance, silicon diode D1 and the 200 K ohm resistor bias transistor 102 to the onset of conduction. As R3 is advanced, conduction through transistor 102 increases to a maximum value of about 50 microamperes when R3 is set to 10K ohms or maximum. This current is supplied at a high effective internal impedance due to the collector resistance of the transistor. Since this current supply provides a reference or threshold value for error detector 9, it constitutes a SLIP control for the brake system. This control constitutes a "factory adjustment" that will be set in accordance with the characteristics of the vehicle. It will be set for the desired degree of wheel slip for maximum braking effectiveness at the front wheels. This is the peak of the total power curve of FIG. 1.

Microcircuit 101 is a type 709 device with suitably modified frequency compensation. The output compensation is a 3 picrofarad capacitor connected between pins 5 and 6, and input compensation is by way of a 100 picrofarad capacitor in series with a 1.5K ohm resistor connected between pins 1 and 8. The output of microcircuit 101 is fed through a phase shift network back to the inverting input at pin 2. A three section network is used involving the 10K, 33K, and 100K resistors along with the 1, 0.47, and 0.1 microfarad capacitors. Resistors R4 and R5 return the inverting and non-inverting inputs to ground. The feedback will cause the circuit to oscillate at the frequency for which the phase shift is 180° (about 50 c.p.s.). The circuit has sufficient gain to saturate the oscillations to a degree that results in a series of output pulses. When the microcircuit 101 differential input is zero, or when pins 2 and 3 are at the same potential, the oscillator duty cycle is 50 percent. This means that the output is a symmetrical square wave. Any differential input will vary the duty cycle of the oscillator. If the positive going output pulse is considered, making inverting input terminal 2 more positive than noninverting terminal 3 will result in narrower positve pulses.

In the absence of differential input to error detector, which occurs when there is little or no braking action, the slip circuit of transistor 102 and associated components will bias the oscillator sufficiently to prevent oscillation and this condition will persist until the differential input driving terminal 3 toward the potential of terminal 2 causes osicllation to start. As terminal 3 is made less negative than terminal 2, as would result from increased front wheel slip, the oscillator pulse width will increase.

The output of microcircuit 101 is applied through the 5.6K ohm resistor to an amplifier with silicon planar diode D2 permitting the passage of only positive pulses. A 6.8K ohm resistor provides a d-c return. NPN transistors 103 and 104 are Darlington connected and drive the coil in the spool valve. Transistor 104 is a power amplifying device capable of supplying sufficient current to drive the spool valve coil 115. The 330 picofarad capacitor prevents oscillation in the amplifier.

Figure 8:
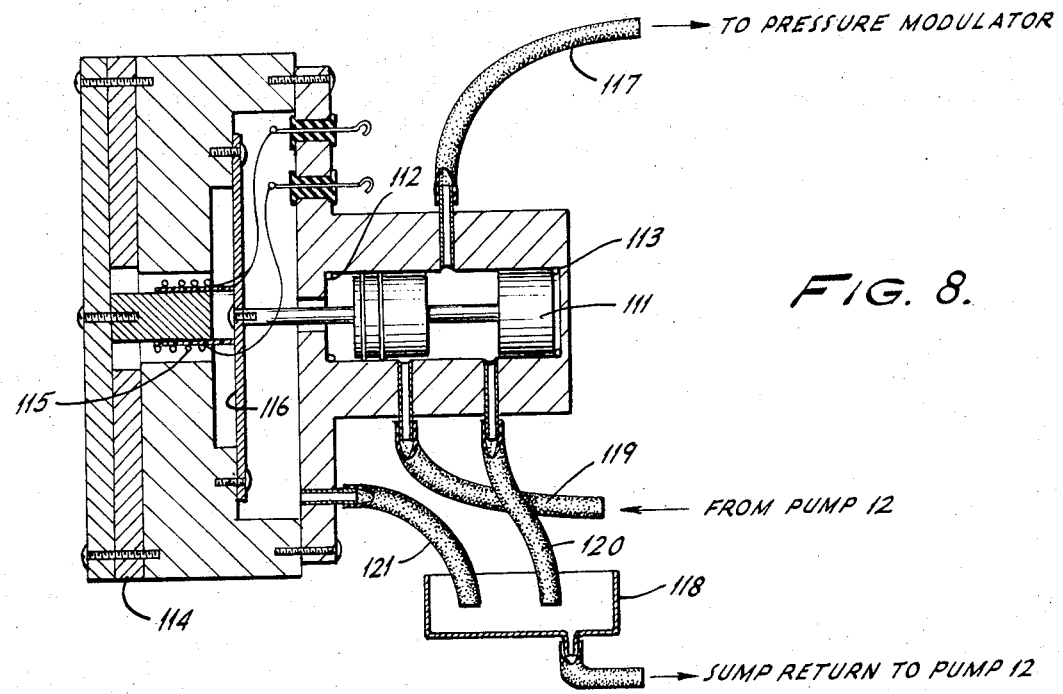
FIG. 8 is a cut-a-way drawing showing the construction of the pulse width modulatable spool valve.

FIG. 8 shows the construction of the spool valve 11 of FIG. 3. The spool 111 shuttles between two positions set by stops 112 and 113 and is driven by diaphragm mounted coil 115. The spool driver is constructed in a manner similar to that of a dynamic loudspeaker driver. Magnet 114 applies a strong field across a circular air gap. Coil 115 is located in the gap and is mounted on diaphragm 116 which centers the coil in the air gap. The diaphragm also provides a spring action to return the coil 115 and spool 111 to their rest positions (shown).

In the rest position of the spool output line 117 communicates with sump 118 through line 120. This provides a return supply to hydraulic source and pump 12. Since this system is at atmospheric pressure there is no pressure in output line 117.

When coil 115 is energized from device 10 of FIG. 3 (more specifically transistor 104 of FIG. 7) it will pull the spool 111 over to stop 112. For this condition hydraulic supply line 119 communicates with output line 117 ans full pressure is applied to pressure modulator 13 which is shown as one of the blocks of FIG. 3, and in detail in FIG. 9. Since, under normal conditions the output of circuit 10 is zero, spool 111 is against stop 113. When the differential output from error detector 9 exceeds a predetermined value the normally inoperative oscillator starts and, through the agency of the spool valve driver 114, 115, 116, causes spool 111 to oscillate between its normal rest position (shown) and a position against stop 112. When, in response to increased differential wheel slip, the pulse width of the oscillator increases, spool 111 dwells a greater percentage of time against stop 112 and more hydraulic pressure is applied to output line 117.

Since the spool is forced to shuttle rapidly from one extreme to the other, there is little chance of its hanging up or sticking. Hydraulic fluid that leaks past the spool is returned to sump 118 through line 121. In the arrangement shown, the spool valve provides an electrical-to-hydraulic pressure control that is relatively linear in response to the error detector's differential electrical output above threshold.

Figure 9:
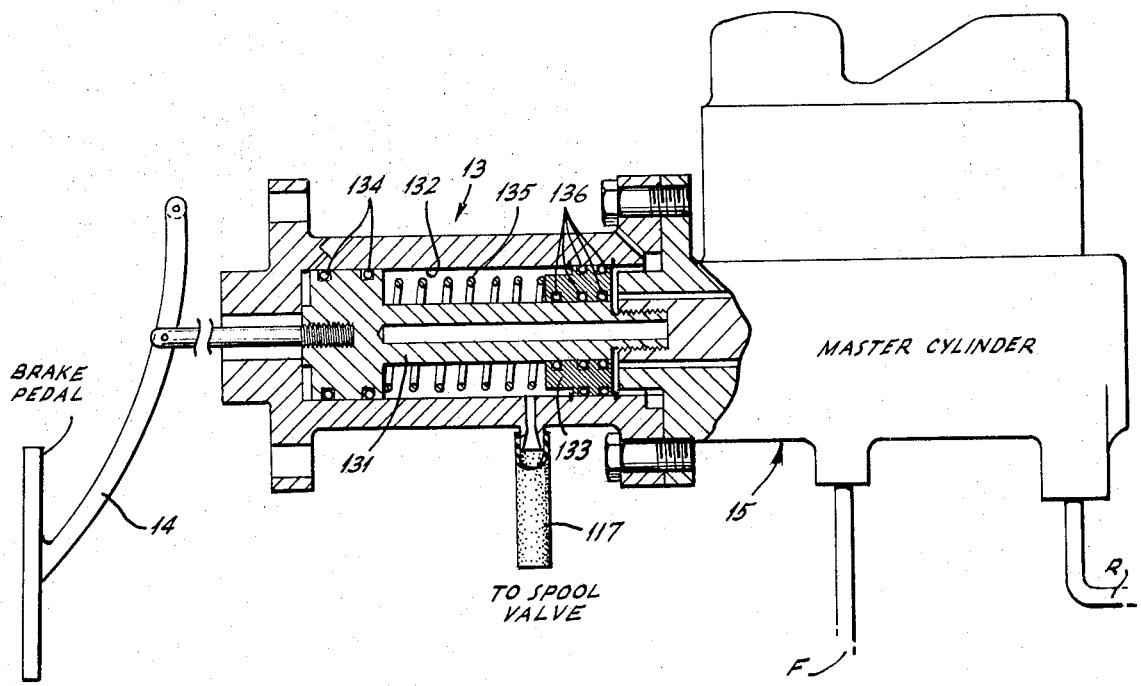
FIG. 9 is a showing, in partial cut-a-way, of the pressure modulator and master cylinder combination.

FIG. 9 shows pressure modulator 13 in cut-a-way section in relation to brake pedal 14 and master cylinder 15. Piston 131 moves inside cylinder 132 that communicates with spool valve 11 through line 117. Shaft seal 133 including O-rings 136 and O-ring piston seals 134 confine the hydraulic fluid inside the cylinder. The brake pedal shaft operates the master cylinder through piston 131 in the conventional manner. When brake control is to be applied to antiskid operation, the spool valve applies hydraulic fluid under pressure from the source and pump 12. The pressure in cylinder 132 acts against piston 131 forcing it back against the brake pedal and thereby reducing the force applied to the master cylinder 15. Spring 135 acts to return the piston to its rest position as shown.

While the spool valve supplies hydraulic fluid in a series of pulses at a rate of about 50 pulses per second, the hydraulic action will integrate them in a smoothly controlled antibraking action. Since the control force acts against the brake pedal, the vehicle operator will feel the action and thereby be notified of its operation. In practice, at a hydraulic pressure of 800 p.s.i. and using a piston 131 with a 1¾ square inch area, a force of 1,400 pounds is available. This value is such that the operator cannot override the system. However where desired the pressure can be reduced so that override can occur for the express purpose of permitting a highly skilled driver to purposely produce a locked wheel condition where he deems it helpful in controlling the vehicle.

While the invention is shown and described in terms of conventional, non-power-assisted brake system, a power boost system could be included if desired. It is preferred to insert the power booster between the brake pedal 14 and pressure modulator 13. However, the modulator action could be incorporated in the power booster system if desired.

In addition while the system shown as the preferred embodiment uses analog quantity generation and analog computer functions, a digital approach could be used instead. While the computer is a combination of electrical and hydraulic elements it could be either completely or partly fluidic including sensors, computation, and actuators. While the spool valve is shown as pulse-width modulated it could be constructed as an analog device with output pressure proportional to electrical input. The preferred embodiment is only one successful realization of equipment used to practice the invention, the breadth of which should be limited only by the claims.

We claim:

1. An anti-skid braking system for use in a four-wheeled vehicle having one end heavier than the other comprising:
    a. means for applying an actuating force to said system,
    b. means responsive to said actuating force for braking each of said four wheels; said braking means providing a fluid braking force responsive to said actuating force,
    c. means for proportioning the fluid in said braking means to provide substantially greater braking action to the wheels at the heavier end of said vehicle than the wheels at the lighter end of said vehicle,
    d. means for sensing the speed of each wheel,
    e. means for comparing the difference in speed between the faster wheel at the lighter end of said vehicle and the slower wheel at the heavier end of said vehicle, and
    f. means for reducing said actuating force when said difference in speed exceeds a predetermined value.

2. The system of claim 1, wherein said means for sensing includes a tachometer and a frequency to voltage converting electronic circuit.

3. The system of claim 1, wherein the means of clauses (d) and (e) involve electrical signals and the means of clause (f) involves hydraulic signals.

4. The system of claim 3, wherein the means of clause (f) includes means for producing a hydraulic force that is proportional to the electrical signal quantity produced by the means of clause (e).

5. In a vehicle having four wheels and a front-end located engine, an anti-skid braking system comprising:
  a. hydraulic braking means including a master cylinder for applying braking force to each wheel, said braking force being applied to said wheels in response to actuating a brake pedal.
  b. means for proportioning the torque produced by said braking means to reduce rear wheel braking,
  c. means at each of said wheels for producing an analog meausre that is proportional to the speed of the wheel,
  d. means for selecting the analog measure related to the slower front wheel,
  e. means for selecting the analog measure related to the faster rear wheel,
  f. means for sensing the differential between the analog measures of clauses (d) and (e) and,
  g. means for reducing the force said brake pedal applies to said master cylinder in proportion to the amount said differential exceeds a predetermined minimum value.

6. The system of claim 5, wherein the means of clause (c) includes an electronic circuit having an output proportional to wheel speed.

7. The system of claim 5, wherein the means of clause (g) includes a hydraulic element having a force characteristic proportional to the electrical value of said differential of clause (f).

8. The system of claim 7, wherein the means of clause (g) further includes means connected between said pedal and said master cylinder for reducing the force transmitted threbetween in proportion to the pressure supplied by said hydraulic element.

9. In a four-wheeled vehicle having a front mounted engine, an anti-skid braking system comprising:
  a. means for applying hydraulic braking to each of said four wheels, said means including a master cylinder and brake pedal for actuation,
  b. means for proportioning said hydraulic braking to apply a reduced braking action to the rear wheels of said vehicle,
  c. means for sensing the speed of each wheel to produce an electrical signal proportional to the speed of each wheel,
  d. means for selecting the electrical signal produced by the faster rear wheel,
  e. means for selecting the electrical signal produced by the slower front wheel,
  f. means for comparing the faster rear wheel signal with the slower front wheel signal to produce an output proportional to the differential between said compared signals,
  g. means for producing a hydraulic force proportional to said differential in said electrical signals when said differential exceeds a predetermined minimum value, and
  h. means responsive to said proportional hydraulic force to reduce the pressure said brake pedal applies to said master cylinder.

* * * * *